March 18, 1924.
W. S. JORDAN
COMBINATION RECEPTACLE
Filed March 27, 1923    2 Sheets-Sheet 1
1,487,574
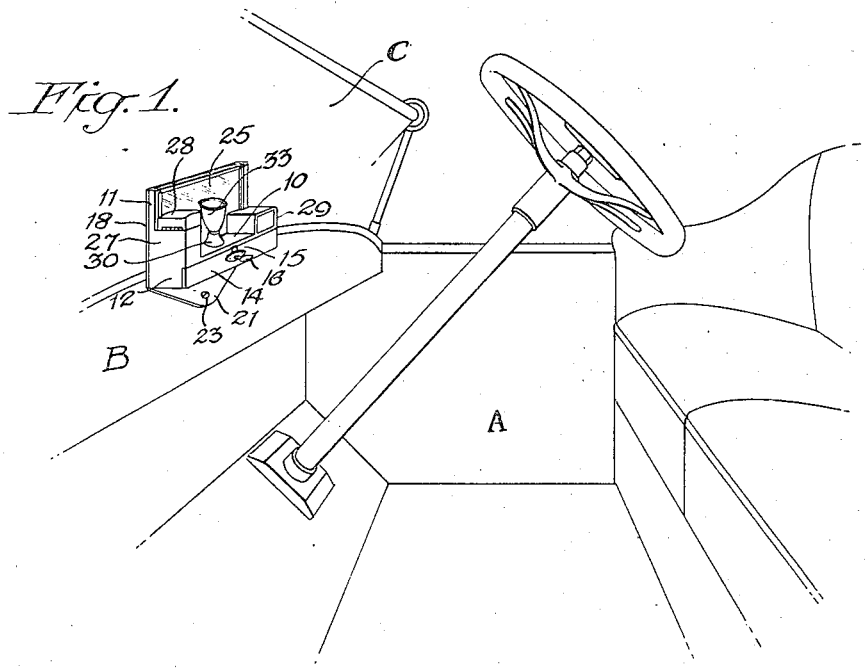
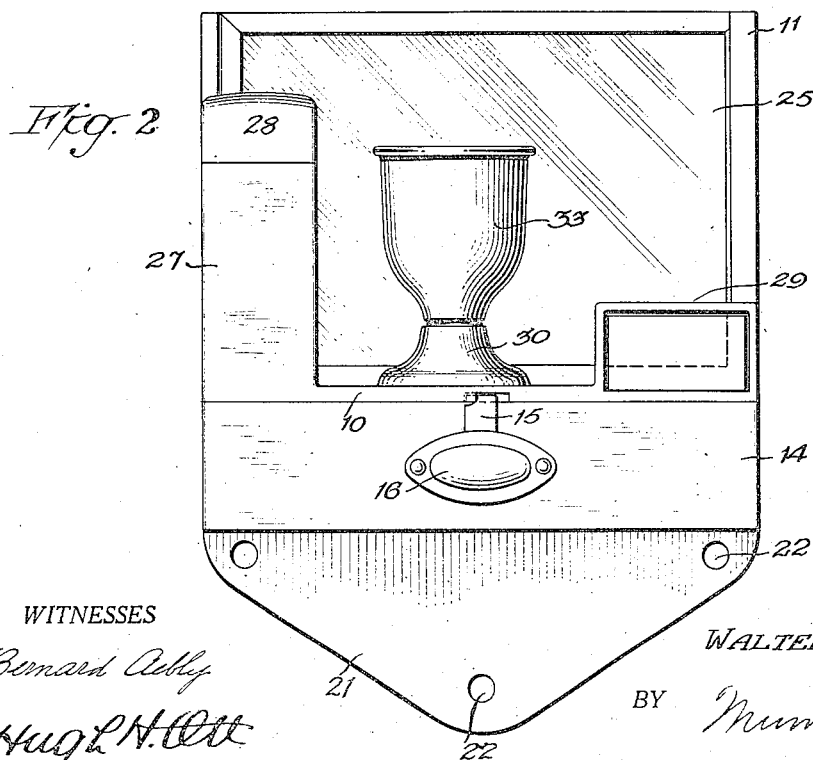
WITNESSES
INVENTOR
WALTER S. JORDAN
BY
ATTORNEYS March 18, 1924.
W. S. JORDAN
COMBINATION RECEPTACLE
Filed March 27, 1923    2 Sheets-Sheet 2
1,487,574
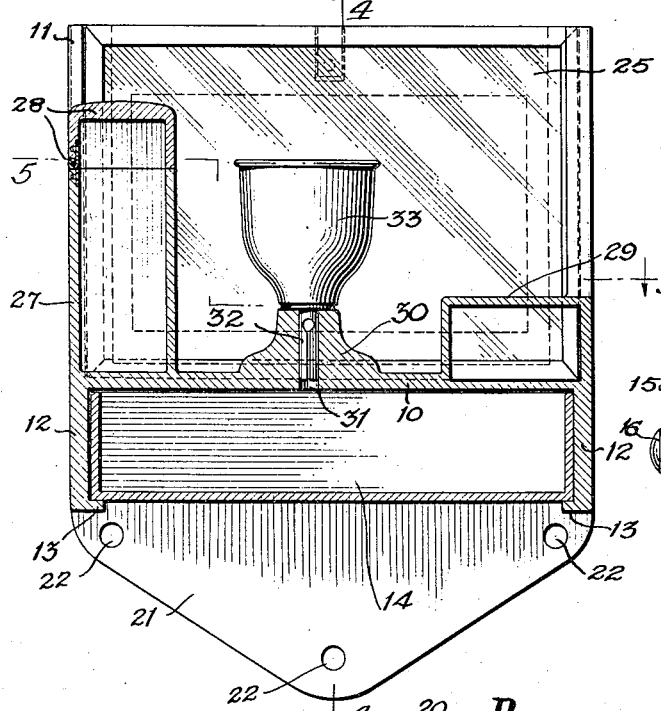
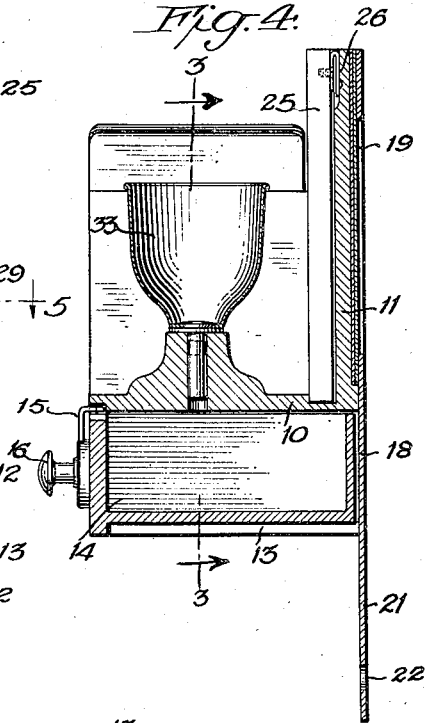
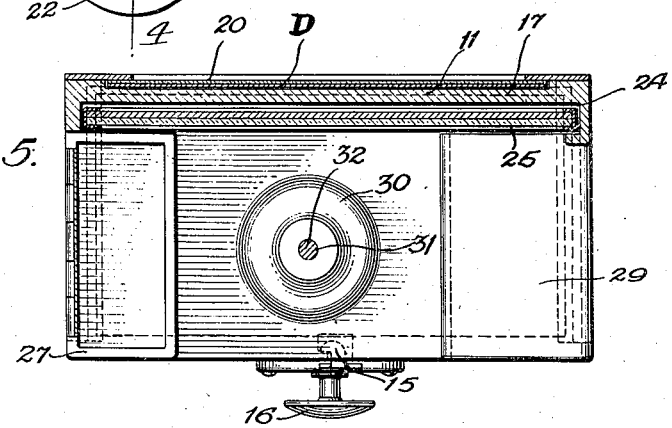
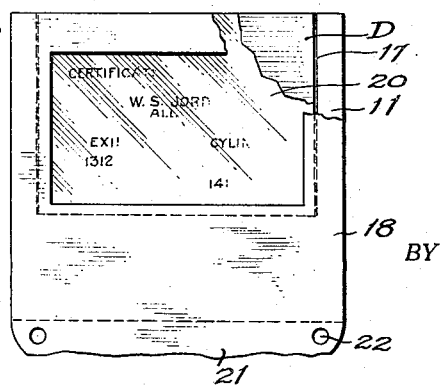
WITNESSES
INVENTOR
WALTER S. JORDAN
BY
ATTORNEYS Patented Mar. 18, 1924.

1,487,574

UNITED STATES PATENT OFFICE.

WALTER SCOTT JORDAN, OF ALVO, NEBRASKA.

COMBINATION RECEPTACLE.

Application filed March 27, 1923. Serial No. 628,088.

*To all whom it may concern:*

Be it known that I, WALTER S. JORDAN, a citizen of the United States, and a resident of Alvo, in the county of Cass and State of Nebraska, have invented a new and Improved Combination Receptacle, of which the following is a full, clear, and exact description.

This invention has relation to receptacles and has particular reference to a combination receptacle which is especially designed for use in connection with automobiles or other vehicles.

One of the principal objects of the present invention is to provide a combined receptacle which is adapted to be positioned on the dash of a vehicle for the purpose of receiving smoking requisites and identification and license card which will be displayed through the wind shield and a mirror whereby said articles will be within convenient reach of the driver or other occupants of the vehicle.

Further objects of the invention resides in the provision of a combination receptacle of the character set forth which is simple and compact in construction, inexpensive to manufacture and produce, readily installed and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a fragmentary perspective view of the interior of an automobile with the combination receptacle in place.

Fig. 2 is a front view of the receptacle.

Fig. 3 is a sectional view therethrough taken approximately on the line 3—3 of Fig. 4.

Fig. 4 is a sectional view taken approximately on the line 4—4 of Fig. 3.

Fig. 5 is a horizontal sectional view taken approximately on the line 5—5 of Fig. 3.

Fig. 6 is a rear view of the receptacle, parts being broken away to disclose the underlying structure.

Referring to the drawings by characters of reference, A designates the front or driver's compartment of an automobile, B the dash or instrument board and C the windshield. The combination receptacle which constitutes the invention is preferably cast or constructed from a single piece of material but includes a horizontal or base wall 10 and an upstanding vertical rear wall 11, said base or horizontal wall 10 being provided with depending side walls 12 which are formed with inwardly projecting flanges 13 at their lower ends but define a drawer slide or compartment in which a drawer 14 is mounted. A suitable catch 15 and handle 16 are provided on the drawer for respectively retaining the same in place and for disengaging the latch and withdrawing said drawer. The rear face of the wall 11 is provided with a recess 17 which extends from a point slightly above its lower end to its upper end and is of slightly lesser width than the width of said wall. A plate 18 having a window opening 19 therein is secured to the rear face to define with the recess 17 a compartment for the reception of a license or identification card D for the owner of the vehicle. In practice a transparent strip 20 such as celluloid or glass is arranged in the compartment to cover the outer face of the card for protecting the same. The lower end of the plate 18 extends over and contacts with the rear edges of the depending walls 12 to serve as an abutment for the rear end of the drawer 14 and said plate is provided with an extension 21 which is perforated as at 22 to constitute an attaching bracket for securing the receptacle to the instrument or dashboard B by securing screws or elements 23. The receptacle is so positioned when attached to the dash or instrument board as to dispose the window opening 19 in the plate 18 above the upper edge of the dash or instrument board and the lower edge of the windshield whereby the identification card will be clearly visible therethrough. The front face of the wall 11 is recessed as at 24 to removably receive therein a mirror 25 which is retained against accidental displacement by means of a spring catch 26. Immediately in front of the mirror the horizontal or base wall 10 is formed with an upstanding box-like receptacle 27 which constitutes a case for cigarettes and is provided with a hinged cover 28. Adjacent the opposite side the wall 10 is provided with a horizontally disposed box-like receptacle 29 which is of a size to snugly receive a box of matches. The wall 10 is further provided with an upstanding bearing boss 30 having a central opening 31 which receives the split resilient shank 32 of an ash tray 33.

In practice the drawer 14 may be utilized for cigars or other articles and it will thus be seen that the operator is provided with a receptacle having various compartments for smoking requisites as well as a mirror and an identification and license card all of which are within convenient reach and which serves to display the card to persons standing adjacent the front of the vehicle. When the ash tray 33 is filled, it is only necessary for the operator to retract or withdraw the shank 32 from the opening 31 to empty the same, the split shank having sufficient resiliency to normally retain the tray in place.

I claim:

1. In a receptacle of the character set forth, a body defining a drawer slide, a drawer mounted therein, an upstanding case having a hinged closure for the reception of cigarettes, a horizontal compartment for the reception of a match box, an upstanding bearing boss, a removable ash tray, means on the ash tray for frictionally associating the same with the bearing boss, and a vertical wall having guides in its opposite faces for holding a mirror and for receiving a license card.

2. In a receptacle of the character set forth, a body defining a drawer slide, a drawer mounted therein, an upstanding case having a hinged closure for the reception of cigarettes, a horizontal compartment for the reception of a match box, an upstanding bearing boss, a removable ash tray, means on the ash tray for frictionally associating the same with the bearing boss, a vertical wall having guides in its opposite faces for holding a mirror and for receiving a license card, and an attaching bracket depending from said body for securing the same to the dash or instrument board of a vehicle whereby the vertical wall will be disposed above the lower edge of the wind shield to display therethrough the license card.

3. In a receptacle of the character set forth, a body constructed of a single piece of material to provide a horizontal base wall, a vertical upstanding rear wall having recesses in the front and rear faces thereof for the reception of separate articles, an upstanding box-like receptacle at one side of the base wall, a horizontally disposed box-like receptacle at the opposite side of said base wall, an upstanding bearing boss intermediate of said base wall, side walls depending from said base wall, inwardly projecting flanges on said side walls defining a drawer slide, and a plate secured to the rear end of said body having a window opening registering with the recess in the rear side of said wall, closing the rear end of the drawer slide and extending below said drawer slide to define an attaching bracket.

4. In a receptacle of the character set forth, a body constructed of a single piece of material to provide a horizontal base wall, a vertical upstanding rear wall having recesses in the front and rear faces thereof for the reception of separate articles, an upstanding box-like receptacle at one side of the base wall, a horizontally disposed box-like receptacle at the opposite side of said base wall, an upstanding bearing boss intermediate of said base wall, side walls depending from said base wall, inwardly projecting flanges on said side walls defining a drawer slide, and a plate secured to the rear end of said body having a window opening registering with the recess in the rear side of said wall, closing the rear end of the drawer slide and extending below said drawer slide to define an attaching bracket, the said upstanding bearing boss having a socket and an ash tray having a split shank adapted to frictionally engage in the socket for associating the ash tray with the structure.

WALTER SCOTT JORDAN.